United States Patent Office 3,150,151
Patented Sept. 22, 1964

3,150,151
FUNGICIDAL COMPOUND OF THE AMINO-
PHENYL DIAZO SERIES
Ewald Urbschat, Cologne-Mulheim, Ferdinand Grewe,
Cologne-Stammheim, and Paul-Ernst Frohberger, Burscheid, Bezirk Dusseldorf, Germany, assignors to Farbenfabriken Bayer Aktiengesellschaft, Leverkusen,
Germany, a corporation of Germany
No Drawing. Filed Aug. 23, 1960, Ser. No. 51,284
Claims priority, application Germany Aug. 29, 1959
6 Claims. (Cl. 260—326.5)

The present invention relates to and has as its objects new and useful fungicidal compositions and methods of combating fungi therewith. Generally the active compounds of the new compositions may be represented by the following formulae

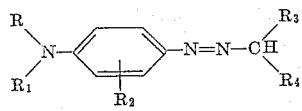

or

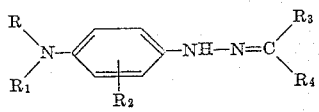

of which according to the latest literature the second formula is preferred. In these formulae R and $R_1$ denote hydrogen and/or eventually substituted aliphatic, araliphatic or aromatic radicals; R and $R_1$ may also include the nitrogen or other hetero atoms to form a ring; $R_2$ stands for an eventual substituent of the benzene nucleus such as alkyl, halogen, nitro, carboxy and the like; $R_3$ and $R_4$ stand for the cyano group and/or the groups $COR_5$, $COR_6$; $R_5$ and $R_6$ denote organic radicals which may be bonded with the —CO— group directly or via hetero atoms such as nitrogen or oxygen. Moreover, they may form a cyclic β-diketone together with the —CH— group or represent the radical of a heterocyclic ring such as the pyrazolone ring which contains a reactive methylene group on account of appropriate substitution.

As it is to be seen these formulae differ from each other only by the position of the double bond, but it is without importance for the present invention in which state the compounds of this invention are existing.

It is known that p-aminophenyl-hydrazine compounds are especially effective against micro organisms living in agricultural soil and causing germ diseases. On the other hand, their effect on leaf fungi is negligible. Aminophenyldiazo compounds such as dimethyl-aminophenyl-diazo sulfonate show the same effects.

Surprisingly it has now been found that the above class of substances related to these groups of compounds is also highly effective against fungus infections of the green parts of plants. These classes of substances as it is to be seen above are coupling products obtainable from basically substituted aromatic diazonium salts and compounds containing reactive methylene groups. They may be considered either as azo compounds or also as hydrazones.

As suitable coupling components in the meaning of this invention there may be mentioned the following: cyanacetic ester, malonic acid ester, acetoacetic ester, acetoacetic acid amides, acetylacetone, dihydro-resorcinol, pyrazolone and the like. The production of the substances some of which are new is effected by methods known as such and is described in the following example which is given for the purpose of illustrating the invention.

EXAMPLE

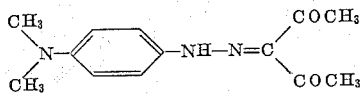

27.2 grams of p-aminodimethyl-aniline are diazotized in 200 cc. of water and 60 grams of concentrated hydrochloric acid with 14 grams of sodium nitrite in 30 cc. of water. After neutralizing the excess hydrochloric acid with sodium acetate, the solution is run into 30 grams of acetylacetone in 1 litre of water. The mixture is rendered alkaline with sodium bicarbonate, the resulting precipitate, after stirring for several hours and standing for 20 hours, filtered off with suction, washed and dried. The compound thus obtained in a yield of about 80% can be re-dissolved from methanol forming red-brown brilliant crystals which melt at 123° C.

In a similar way there may be obtained the following compounds as well as others falling within the scope of this application.

Table 1

R—X—NH—N=R₁

| R | X | R₁ | | M.P. |
|---|---|---|---|---|
| CH₃\N—C₆H₄—NH—N=C/CH₃ | | COOC₂H₅ / COCH₃ | Red-brown crystals from methanol | 113°. |
| CH₃\N—C₆H₄—NH—N=C/CH₃ | | COOC₂H₅ / CN | Dark red leaflets from methanol | 120° decomposition. |
| CH₃\N—C₆H₄—NH—N=C/CH₃ | | COC₆H₅ / COOC₂H₅ | Brown crystals from methanol | 85°. |
| CH₃\N—C₆H₄—NH—N=C/CH₃ | | CO—C₆H₄—NO₂ / COOC₂H₅ | Red-brown crystals from alcohol | 150°. |

Table 1—Continued

| R | X | R₁ | Description | M.P. |
|---|---|---|---|---|
| $(CH_3)_2N-C_6H_4-NH-N=C$ | $COCH_3$ / $CONH-C_6H_5$ | | Dark red crystal from alcohol | 127°. |
| $(CH_3)_2N-C_6H_4-NH-N=C$ | $COCH_3$ / $CONH-C_6H_4-Cl$ | | Red crystals from alcohol | 143°. |
| $(CH_3)_2N-C_6H_4-NH-N=C$ | $CO-CH_2$ / $CO-CH_2$ (with $CH_2$ bridge) | | Red-brown crystals from acetic ester | 176° decomposition. |
| $(CH_3)_2N-C_6H_4-NH-N=C$ | $CO-CH_2$ / $CO-CH_2$ (with $CH-COOH$ bridge) | | Dark red crystals from dimethylformamide. | 252° decomposition. |
| $(CH_3)_2N-C_6H_4-NH-N=C$ | $CO-NH$ / $C=N$ / $CH_3$ | | Dark violet crystals from alcohol | 209° decomposition. |
| $(CH_3)_2N-C_6H_4-NH-N=C$ | $CO-N-C_6H_5$ / $C=N$ / $CH_3$ | | Red crystals from methanol | 142° decomposition. |
| $(CH_3)_2N-C_6H_4-NH-N=C$ | $CO-N-(2,5-Cl_2C_6H_3)$ / $C=N$ / $CH_3$ | | Crystals from methanol | 152°. |
| $(CH_3)_2N-C_6H_4-NH-N=C$ | $CO-NH$ / $CO$ / $CO-NH$ | | Dark red crystals from dimethyl-formamide. | 252° decomposition. |
| $(CH_3)_2N-C_6H_4-NH-N=C$ | $CO(CH_2)_{16}-CH_3$ / $COOC_2H_5$ | | Red crystals from petroleum-ether | 63°. |
| $(CH_3)_2N-C_6H_3(Cl)-NH-N=C$ | $COCH_3$ / $COCH_3$ | | Red crystals from methanol | 160°. |
| $(CH_3)_2N-C_6H_3(CH_3)-NH-N=C$ | $COCH_3$ / $COCH_3$ | | Red crystals from alcohol | 156°. |
| $H_2N-C_6H_4-NH-N=C$ | $COCH_3$ / $COCH_3$ | | Red crystals from alcohol | 161°. |
| $(C_2H_5)_2N-C_6H_4-NH-N=C$ | $COCH_3$ / $COCH_3$ | | Dark red crystals from alcohol | 70°. |
| $(C_6H_5)(H)N-C_6H_4-NH-N=C$ | $COCH_3$ / $COCH_3$ | | Red brown crystals from alcohol | 151°. |
| (pyrrolidino)$-C_6H_4-NH-N=C$ | $COCH_3$ / $COCH_3$ | | Dark red crystals from light petrol | 135°. |

*Table 1*—Continued

| R | X | R₁ | | M.P. |
|---|---|---|---|---|
| (CH₂-CH₂)₂N–, 3-Cl | –C₆H₄– | –NH–N=C(COCH₃)₂ | Red crystals from acetic acid ester | 112°. |
| (CH₂-CH₂)₂N–, 3-COOH | –C₆H₄– | –NH–N=C(COCH₃)₂ | Light-brown crystals from methanol | 180/182°. |
| Pyrrolidino | –C₆H₄– | –NH–N=C(COCH₃)₂ | Brown crystals from methanol | 110/111°. |
| Piperidino | –C₆H₄– | –NH–N=C(COCH₃)₂ | Red crystals from light petrol | 97°. |
| Morpholino | –C₆H₄– | –NH–N=C(COCH₃)₂ | Red crystals from methanol | 170°. |
| Thiomorpholino | –C₆H₄– | –NH–N=C(COCH₃)₂ | Brown needles from alcohol | 125°. |
| (CH₂-CH₂)₂N–, 3-CH₃ | –C₆H₄– | –NH–N=C(COCH₃)₂ | Red leaflets from methanol | 94/96°. |
| (CH₂-CH₂)₂N–, 2-CH₃ | –C₆H₄– | –NH–N=C(COCH₃)₂ | Red needles from methanol | 140/141°. |
| (CH₃)₂N–, 3-COOH | –C₆H₄– | –NH–N=C(COCH₃)₂ | Orange crystals from dimethylformamide | 242/243° decomposition. |
| C₆H₅CH₂N(CH₃)– | –C₆H₄– | –NH–N=C(COCH₃)₂ | Orange crystals from light petrol | 90°. |
| [(CH₃)₂CHCH₂]₂N– | –C₆H₄– | –NH–N=C(COCH₃)₂ | Dark red crystals from methanol | 58/60°. |
| HOCH₂CH₂–N(CH₃)– | –C₆H₄– | –NH–N=C(COCH₃)₂ | Red crystals from methanol | 150/151°. |
| ClCH₂–CH₂–N(CH₃)– | –C₆H₄– | –NH–N=C(COCH₃)₂ | Dark red crystals from acetic ester | 128/129°. |
| (CH₂-CH₂)₂N–CH₂-CH₂–N(CH₃)– | –C₆H₄– | –NH–N=C(COCH₃)₂ | Red crystals from methanol | 239° decomposition. |
| Octahydroquinolino | –C₆H₄– | –NH–N=C(COCH₃)₂ | Red crystals from light petrol | 106°. |

*Table 1—Continued*

| R | X | R₁ | | M.P. |
|---|---|---|---|---|
| CH₃NH—⌬(CH₃)— | —NH—N=C | (COCH₃)(COCH₃) | Yellow-brown crystals from methanol | 52°. |
| carbazol-9-yl-CH₂—C₆H₄— | —NH—N=C | (COCH₃)(COCH₃) | Brown crystals from dimethyl-formamide/alcohol. | 183°. |
| (CH₃CH₂CH₂CH₂)₂N—C₆H₄— | —NH—N=C | (COCH₃)(COCH₃) | Brownish red crystals from methanol | 63/64°. |

Part of these compounds also may be obtained by the reaction of corresponding p-amino-phenylhydrazines and corresponding triketo-compounds.

The fungicidal compounds according to the invention are highly active leaf fungicides. Their effect is shown in the following Table 2 taking *Phytophthora infestans* on tomatoes as an example without thereby limiting the effect of the compounds to the said disease. The compounds are also active against, for example, *Alternaria solani* on potatoes and tomatoes as well as against *Plasmopara viticola* on vine (Peronospora). The figures given in Table 2 represent the infestation of the cultured plants after artificial infection with the above mentioned fungi, referred to the untreated control plant the degree of infestation of which is assumed to equal 100.

*Table 2*

| R | X | R₁ | Effect on phytophthora on tomatoes in a concentration (aqueous) of— | | | | |
|---|---|---|---|---|---|---|---|
| | | | 0.05% | 0.025% | 0.0125% | 0.0062% | 0.0031% |
| (CH₃)₂N—C₆H₄— | —NH—N=C | (COCH₃)(COCH₃) | 0 | 0 | 0 | 0.4 | 2 |
| (CH₃)₂N—C₆H₄— | —NH—N=C | (COCH₃)(CONH—C₆H₅) | | 11 | 32 | | |
| (CH₃)₂N—C₆H₄— | —NH—N=C | (CO—CH₂—CH₂—CO—CH₂) ring | | | 44 | 49 | 76 |
| (CH₃)₂N—C₆H₄— | —NH—N=C | (CO—NH—C(CH₃)=N) ring | | 29 | 31 | | |
| (CH₃)₂N—C₆H₄(CH₃)— | —NH—N=C | (COCH₃)(COCH₃) | | 0 | 0 | 0 | |
| H₂N—C₆H₄— | —NH—N=C | (COCH₃)(COCH₃) | 17 | 18 | 39 | 54 | 68 |
| (C₂H₅)₂N—C₆H₄— | —NH—N=C | (COCH₃)(COCH₃) | | | 2 | 25 | 53 |
| (CH₂—CH₂—CH₂—CH₂)N—C₆H₄— | —NH—N=C | (COCH₃)(COCH₃) | | | 1 | 9 | 28 |
| (CH₃)(CH₂)N—C₆H₄— | —NH—N=C | (COOC₂H₅)(COCH₃) | 0 | 0 | 2 | 3 | 9 |

Table 2—Continued

| R | X | R₁ | Effect on phytophthora on tomatoes in a concentration (aqueous) of— | | | | |
|---|---|---|---|---|---|---|---|
| | | | 0.05% | 0.025% | 0.0125% | 0.0062% | 0.0031% |
| $\begin{array}{c}CH_3\\ \diagdown\\ N-C_6H_4-NH-N=C\\ \diagup\\ CH_3\end{array}$ | | $\begin{array}{c}COOC_2H_5\\ \diagup\\ \diagdown\\ CN\end{array}$ | ---------- | 3 | 13 | 40 | 54 |
| $\begin{array}{c}CH_3\\ \diagdown\\ N-C_6H_4-NH-N=C\\ \diagup\\ CH_3\end{array}$ | | $\begin{array}{c}COC_6H_5\\ \diagup\\ \diagdown\\ COOC_2H_5\end{array}$ | ---------- | 3 | 8 | 21 | 36 |
| Zinc-ethylene-bis-dithiocarbamate | | | 10 | 22 | 32 | 54 | 57 |

From Tables 3 to 5 there can be seen the results of experiments with 3 compounds taken as examples for the suitability of the class of compounds to be used according to the invention as agents for treating seeds and soil against fungus diseases.

The experiments have been carried out in usual manner. The preparations were extended with talcum and used as dry disinfectants at the concentrations in active substance and in the quantities indicated. It is of course also possible to use other powdered extenders or to prepare genuine solutions, emulsions or suspensions to be used for treating seeds. For soil treatment, the preparations are milled with talcum in a proportion of about 1:10 and then further extended with fine sand. Here also it is of course possible to apply the preparations together with other extenders or in the form of solutions, emulsions or suspensions or also in the solid form as a granulate either alone or in combination with other plant protectives, fertilizers or agents for improving the soil structure.

For the disinfecting and soil treatment experiments there were used as seed peas which are susceptible to diseases and were sown into compost soil naturally infested by *Pythium ultimum* in ratio of 2 × 50 grains per test member. After a test duration of 3 weeks at temperatures of about 18° C., the results were evaluated by counting the healthy plants which had grown out of 100 seeds in each case. The mean effect is illustrated in each case by the increase in the number of healthy plants compared with the untreated control member.

Table 3

| Preparation | Disinfection test, pythium | | | Soil treatment test, pythium | |
|---|---|---|---|---|---|
| | Conc., percent | Quantity g./kg. | Healthy plants, percent 3 weeks after sowing | Conc. of active subst. in soil in p.p.m. | Healthy plants, percent 3 weeks after sowing |
| Untreated | ---------- | ---------- | 12 | ---------- | 12 |
| Phenyl-Hg-acetate | 2.2 Hg | 2 | 40 | 100 Hg | 37 |
| $(CH_3)_2-N-\langle\rangle-N=N-CH(CO-CH_3)_2$ | 5 | 2 | 77 | 5 | 15 |
| | 15 | 2 | 79 | 25 | 38 |
| | 50 | 2 | 83 | 100 | 51 |

Table 4

| Preparation | Disinfection test, pythium | | | Soil treatment test, pythium | |
|---|---|---|---|---|---|
| | Conc., percent | Quantity g./kg. | Healthy plants, percent 3 weeks after sowing | Conc. of active subst. in soil in p.p.m. | Healthy plants, percent 3 weeks after sowing |
| Untreated | ---------- | ---------- | 14 | ---------- | 0 |
| Phenyl-Hg-acetate | 2.2 Hg | 2 | 28 | 100 Hg | 16 |
| $(CH_3)_2-N-\langle\rangle-NH-N=C\begin{array}{c}CO-CH_2\\ \diagup\\ \diagdown\\ CO-CH_2\end{array}CH-COOH$ | 5 | 2 | 84 | 5 | 23 |
| | 15 | 2 | 84 | 25 | 61 |
| | 50 | 2 | 79 | 100 | 89 |

Table 5

| Preparation | Disinfection test, pythium | | | Soil treatment test, pythium | |
|---|---|---|---|---|---|
| | Conc., percent | Quantity g./kg. | Healthy plants, percent 3 weeks after sowing | Conc. of active subst. in soil in p.p.m. | Healthy plants, percent 3 weeks after sowing |
| Untreated | ---------- | ---------- | ---------- | ---------- | 0 |
| Phenyl-Hg-acetate | ---------- | ---------- | ---------- | 100 Hg | 16 |
| $NH_2-\langle\rangle-N=N-CH-(COCH_3)_2$ | ---------- | ---------- | ---------- | 5 | 4 |
| | ---------- | ---------- | ---------- | 25 | 22 |
| | ---------- | ---------- | ---------- | 100 | 43 |
| | ---------- | ---------- | ---------- | 200 | 66 |
| | ---------- | ---------- | ---------- | 500 | 83 |

The effect of some representatives of the class of substances according to the invention on *Phytophthora infestans* is particularly noteworthy, results being achieved which have hitherto not been obtainable with any known fungicide.

The compounds according to the invention are distinguished by a good compatibility with plants. They can be processed with the use of suitable auxiliaries such as wetting or dispersing agents and inert materials such as kaolin, chalk, bentonite, etc. into sprayable powders or dusts. A combined application with other fungicides and/or insecticides is possible.

We claim:

1. The compound of the following formula

2. The compound of the following formula

3. The compound of the following formula

4. The compound of the following formula

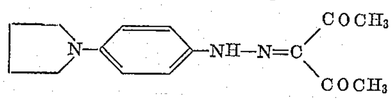

5. A p-amino-phenyl-hydrazine of the formula:

in which A stands for a member selected from the group consisting of amino, dimethyl-amino, diethyl-amino, and pyrrolidyl I; $R_2$ is a member selected from the group consisting of hydrogen, lower alkyl, chlorine and carboxyl; B and D each stand for a member selected from the group consisting of lower alkyl carbonyl, lower alkoxy-carbonyl, cyano, phenyl carbonyl, nitrophenyl carbonyl, phenyl amino carbonyl, chlorophenylamino carbonyl, B and D together with the carbon atom to which they are attached form a member selected from the group consisting of 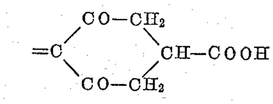 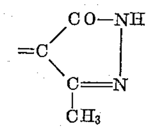 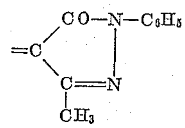 and 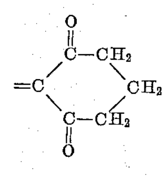 and 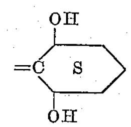 6. A compound of the formula

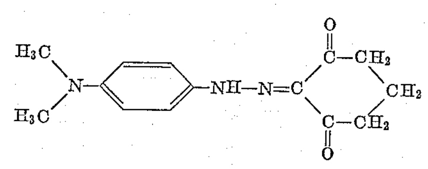

References Cited in the file of this patent

UNITED STATES PATENTS

| | | |
|---|---|---|
| 2,054,062 | Bonrath | Sept. 15, 1936 |
| 2,658,889 | Goldberg et al. | Nov. 10, 1953 |
| 2,681,349 | Dunlop et al. | June 15, 1954 |
| 2,911,336 | Urbschat et al. | Nov. 3, 1959 |
| 2,916,498 | Lutz et al. | Dec. 8, 1959 |
| 2,970,081 | McCall et al. | Jan. 31, 1961 |